(12) United States Patent
Stephens

(10) Patent No.: US 10,813,475 B2
(45) Date of Patent: Oct. 27, 2020

(54) STACKING, DISPLAY, AND SERVING DEVICE FOR PASTRIES AND OTHER FOOD ITEMS

(71) Applicant: Melissa Stephens, Omaha, NE (US)

(72) Inventor: Melissa Stephens, Omaha, NE (US)

( * ) Notice: Subject to any disclaimer, the term of this patent is extended or adjusted under 35 U.S.C. 154(b) by 0 days.

(21) Appl. No.: 16/385,308

(22) Filed: Apr. 16, 2019

(65) Prior Publication Data
US 2019/0320823 A1    Oct. 24, 2019

Related U.S. Application Data

(60) Provisional application No. 62/659,496, filed on Apr. 18, 2018.

(51) Int. Cl.
| | | |
|---|---|---|
| *A47F 5/06* | (2006.01) | |
| *A47J 47/14* | (2006.01) | |
| *A47F 7/00* | (2006.01) | |

(52) U.S. Cl.
CPC .............. *A47F 5/06* (2013.01); *A47F 7/0071* (2013.01); *A47J 47/14* (2013.01)

(58) Field of Classification Search
CPC ...... A47F 5/02; A47F 5/04; A47F 5/06; A47F 5/10; A47F 7/0071; A47J 47/14; A47G 19/00; A47G 23/06
USPC ...................... 211/85.4, 53, 78, 129.1, 131.1
See application file for complete search history.

(56) References Cited

U.S. PATENT DOCUMENTS

| | | | |
|---|---|---|---|
| 1,703,340 A | | 2/1929 | Grennan |
| 2,921,691 A | * | 1/1960 | Dembinski ............... A47B 3/12 |
| | | | 108/101 |
| 3,452,880 A | | 7/1969 | Kovacik et al. |
| 3,951,079 A | | 4/1976 | Tolleson |
| 3,963,126 A | * | 6/1976 | Taub ......................... A47F 5/02 |
| | | | 211/131.1 |
| 4,311,237 A | * | 1/1982 | Hayes .................... A47G 23/08 |
| | | | 206/503 |
| 4,688,684 A | * | 8/1987 | Young .................... A47F 7/281 |
| | | | 108/106 |

(Continued)

FOREIGN PATENT DOCUMENTS

| | | |
|---|---|---|
| GB | 439247 A | 12/1935 |
| GB | 2475527 A | 5/2011 |

OTHER PUBLICATIONS

International Search Report dated Jul. 5, 2019 for PCT/US2019/027911.

*Primary Examiner* — Patrick D Hawn
(74) *Attorney, Agent, or Firm* — Suiter Swantz pc llo

(57) ABSTRACT

A device for stacking, displaying, and serving one or more food items is disclosed. The device may include a base. The device may also include a shaft. The shaft may include at least a first end and a second end. The first end may be removably coupled with the base. The second end may be configured to connect with a removable cap. The device may also include a plurality of stacker pieces. Each stacker piece of the plurality of stacker pieces may be configured to support a food item along positions of the shaft. Each stacker piece may include a support member and a protrusion. The protrusion may have a diameter greater than the diameter of the shaft such that the protrusion is configured to surround the shaft. The support member may include at least one of a bowl, a spoke, a cake pop holder, a disk, or a plate.

8 Claims, 13 Drawing Sheets

(56) References Cited

U.S. PATENT DOCUMENTS

| | | | | |
|---|---|---|---|---|
| 5,487,600 | A * | 1/1996 | Griffin | A47F 3/10 211/129.1 |
| 6,502,707 | B1 * | 1/2003 | Sullivan | A47F 5/02 211/144 |
| 7,287,870 | B1 | 10/2007 | Knoch | |
| D577,962 | S * | 10/2008 | Bauer | D7/552.2 |
| D614,002 | S * | 4/2010 | Heap | D7/610 |
| 7,975,643 | B1 * | 7/2011 | Johnson | A47G 19/30 118/13 |
| 8,276,524 | B2 * | 10/2012 | Goode | A47G 19/00 108/101 |
| 8,813,661 | B2 * | 8/2014 | Fakahany | A47B 87/0246 108/92 |
| 8,915,391 | B2 * | 12/2014 | Radow | A47G 19/00 108/139 |
| 9,681,766 | B2 * | 6/2017 | Fakahany | A47B 87/0246 |
| D793,130 | S * | 8/2017 | Ellison | D6/677.1 |
| 9,949,554 | B2 * | 4/2018 | Sullivan | A47F 5/08 |
| 10,119,652 | B2 * | 11/2018 | Cote | A45F 3/44 |
| 10,130,199 | B2 * | 11/2018 | Deszcz | A47F 5/01 |
| 10,154,744 | B1 * | 12/2018 | Stuart | A47G 23/06 |
| 10,506,873 | B1 * | 12/2019 | Hung | A47B 11/00 |
| 2003/0000903 | A1 | 1/2003 | Mondragon et al. | |
| 2011/0073553 | A1 | 3/2011 | Buege | |
| 2013/0136829 | A1 | 5/2013 | Kandel | |
| 2013/0313213 | A1 | 11/2013 | Ellison | |

* cited by examiner

STACKING, DISPLAY, AND SERVING DEVICE FOR PASTRIES AND OTHER FOOD ITEMS

CROSS REFERENCE TO RELATED APPLICATIONS

The present application claims the benefit under 35 U.S.C. § 119(e) of U.S. Provisional Application Ser. No. 62/659,496 filed Apr. 18, 2018, titled "NOVEL STACKING, DISPLAY, AND SERVING DEVICE FOR PASTRIES AND OTHER FOOD ITEMS." U.S. Provisional Application Ser. No. 62/659,496 filed Apr. 18, 2018 is incorporated by reference in its entirety.

TECHNICAL FIELD

The present disclosure relates generally to the field of serving devices and more particularly to a device for stacking, displaying, and serving pastries, chocolates, and other food items.

BACKGROUND

Displaying and serving food has been a long tradition in human culture since the dawn of mankind. Throughout history, people have invented creative ways to display and serve food. Often, food is elevated to create a grand aesthetic as well as to access vertical space to make use of a small surface area. Wedding cakes, cupcake stands, pie racks, and tiered serving stands are just a few of the many devices that food makers use to not only present or display their creations, but also to serve them.

A drawback that all of these devices suffer, however, is that the food item must be removed from the display and placed on a plate or some other serving piece before it can be eaten. Wedding cakes, with all their grandeur, still must be sliced and plated before a person can enjoy it. Pie racks provide a beautiful and space-saving solution for pies, but again, the pies must be cut and individual pieces placed on separate plates before serving. Cupcake and tiered serving stands help to elevate and display cupcakes, cake pops, and other pastries and food items, however, the individual portions must be plated or cupped before displaying them on the stands.

Another drawback of these traditional food displays is the lack of versatility. For example, wedding cake display devices are usually only used for wedding cakes. Pie racks can only be used for holding pies and tiered display stands can only be used to display food items. Food often has to be transported separate from the display. Also, there is often little opportunity to change the aesthetic of the display piece itself.

As such, it would be desirable to provide a device that addresses the shortcomings of the previous approaches listed above.

SUMMARY

Accordingly, the present disclosure is directed to a device for stacking, displaying, and serving food items. The device may include a base. The device may also include a shaft. The shaft may include at least a first end and a second end. The first end may be removably coupled with the base. The second end may be configured to connect with a removable cap. The device may also include a plurality of stacker pieces. Each stacker piece of the plurality of stacker pieces may be configured to support a food item along positions of the shaft. Each stacker piece may include a support member and a protrusion. The protrusion may have a diameter greater than the diameter of the shaft such that the protrusion is configured to surround the shaft. The support member may include at least one of a bowl, a spoke, a cake pop holder, a disk, or a plate.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the presently preferred embodiments of the disclosure, examples of which are illustrated in the accompanying drawings.

Before any embodiments of the disclosure are explained in detail, it is to be understood that the embodiments may not be limited in application per the details of the structure or the function as set forth in the following descriptions or illustrated in the figures. Different embodiments may be capable of being practiced or carried out in various ways. Also, it is to be understood that the phraseology and terminology used herein is for the purpose of description and should not be regarded as limiting. The use of terms such as "including," "comprising," or "having" and variations thereof herein are generally meant to encompass the item listed thereafter and equivalents thereof as well as additional items. Further, unless otherwise noted, technical terms may be used according to conventional usage. It is further contemplated that like reference numbers may describe similar components and the equivalents thereof.

Referring generally to FIGS. 1A-7, a device for stacking, displaying, and serving food items is disclosed, in accordance with one or more embodiments of the present disclosure.

Figure 1A:
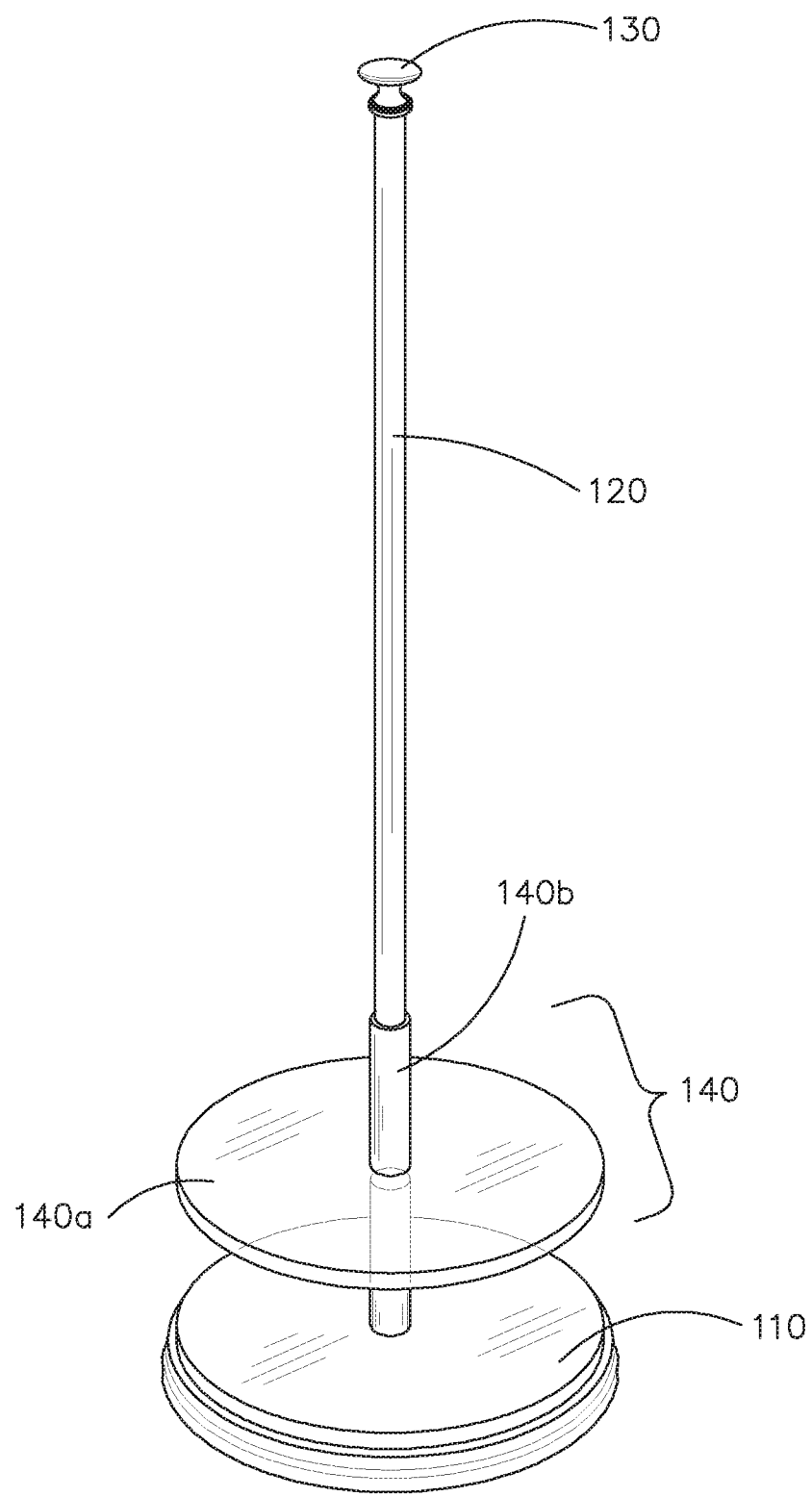
FIG. 1A illustrates a perspective view of a device for stacking, displaying, and serving food items, in accordance with an embodiment of the present disclosure.
Figure 1B:
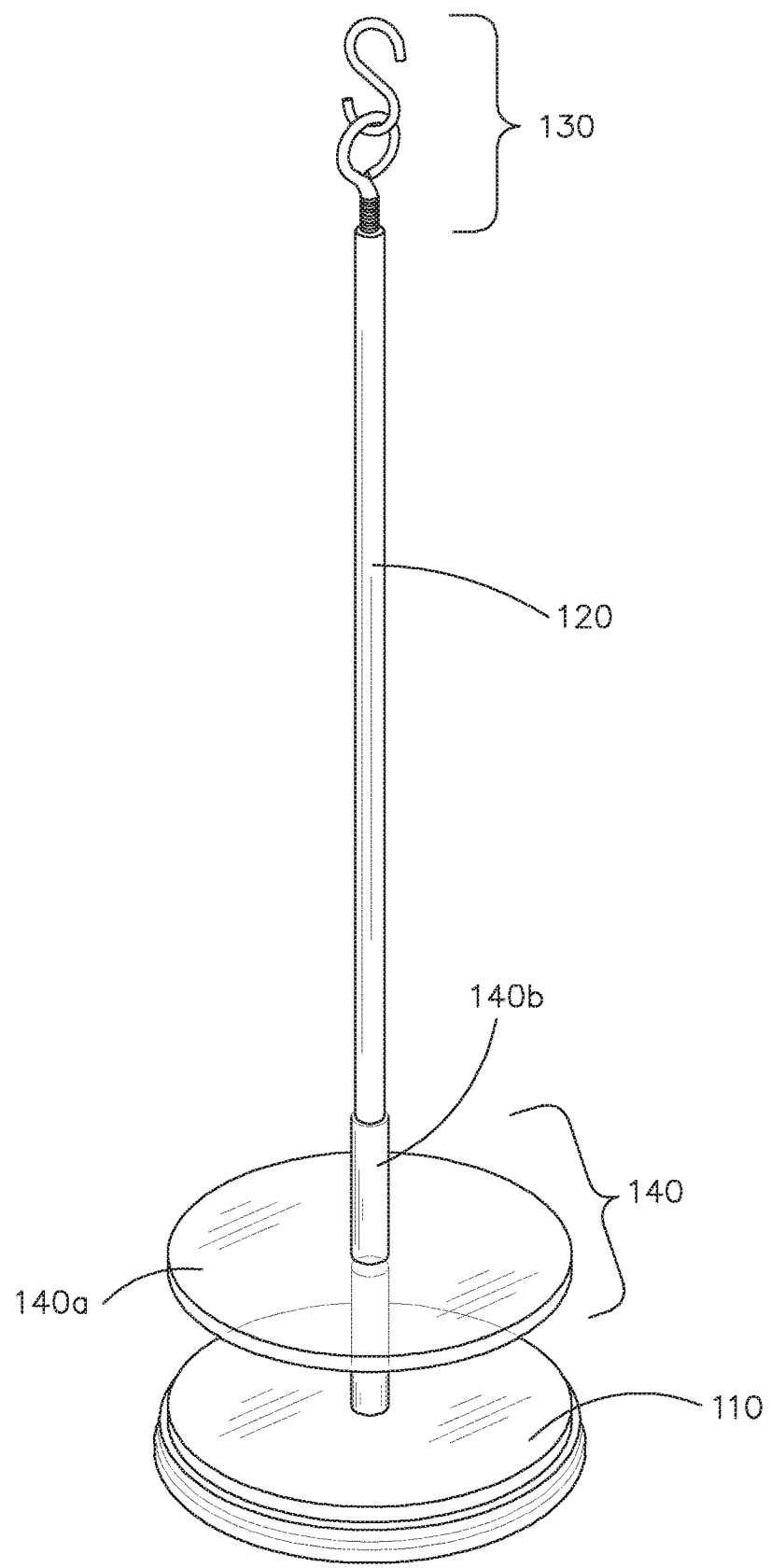
FIG. 1B illustrates a perspective view of a device for stacking, displaying, and serving food items, in accordance with an embodiment of the present disclosure.

FIGS. 1A and 1B illustrate perspective views of a device for stacking, displaying, and serving food items, in accordance with one or more embodiments of the present disclosure. The device 100 may include a base 110, a shaft 120, a removable cap 130, and a plurality of stacker pieces 140.

Referring to FIG. 1A, the removable cap may include a cabinet knob, a drawer knob, a decorative knob, or the like. For example, the removable cap 130 may allow the user to transport the device 100 with food items from one place to another.

The removable cap 130 may include an eye-hook, an eye bolt, a loop, or the like. At least one of the eye-hook, the eye bolt, the loop, or the like may be coupled to an s-hook. For example, as shown in FIG. 1B, the removable cap 130 includes the eye-hook coupled to the s-hook such that the s-hook allows a user to suspend the device 100 from an additional loop or hook. Further, the s-hook configuration allows the user to attach design adornments to enhance the display. For instance, a user may suspend the device 100 from the ceiling or other high point, a pulley/lever attachment, or some other affixed ceiling structure which allows the user to raise and lower the device 100 via the s-hook configuration. The pully/lever attachment may be a remote lazy susan to allow the suspended device 100 to rotate.

Different removable cap 130 options allow someone to change the overall look and presentation of their device. Removable caps 130 can be made in different colors and finishes and shapes to create the desired presentation. For example, the removable cap 130 with a frame or clip allows someone to incorporate a picture or message at the top of their display. By way of another example, the removable cap 130 may include a wedding topper.

Figure 2:
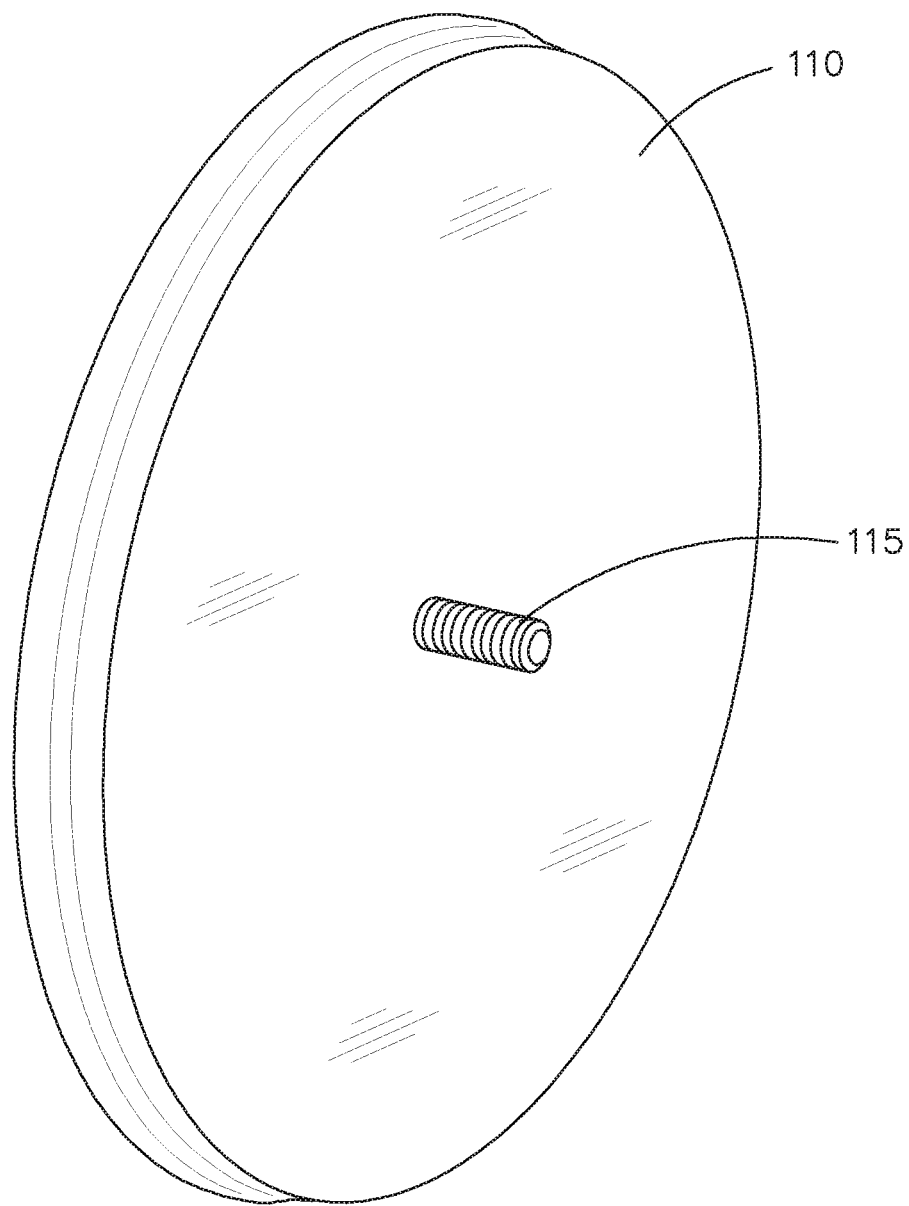
FIG. 2 illustrates an exploded view of a base of a device for stacking, displaying, and serving food items, in accordance with an embodiment of the present disclosure.

FIG. 2 illustrates an exploded view of the base 110 of the device 100, in accordance with one or more embodiments of the present disclosure. The base 110 may be configured to support and keep plum the shaft 120. For example, the base 110 may include an opening for a securing member configured to attach to the shaft 120. For instance, as shown in FIG. 2, the base 110 may include an opening for a screw such that the screw couples to at least the first end or second end of the shaft 120.

It is noted herein that the device 100 can be used without the base, by plunging the shaft 120 into any number of items that can serve as a base, without hindering the functionality of the device. For example, a wooden pedestal with a hole drilled in the center would sufficiently support the shaft. A piece of foam placed in a vase or box would also sufficiently support the shaft. This functionality allows for countless design and display options to fit any event or theme.

The base 110 may be any diameter known in the art. For example, the base 110 may be 5 inches in diameter. By way of another example, the base 110 may be 7 inches in diameter. By way of a further example, the base 110 may be 10 inches in diameter. These dimensions are provided merely for illustrative purposes and shall not be construed as limiting the scope of the present disclosure.

Figure 3:
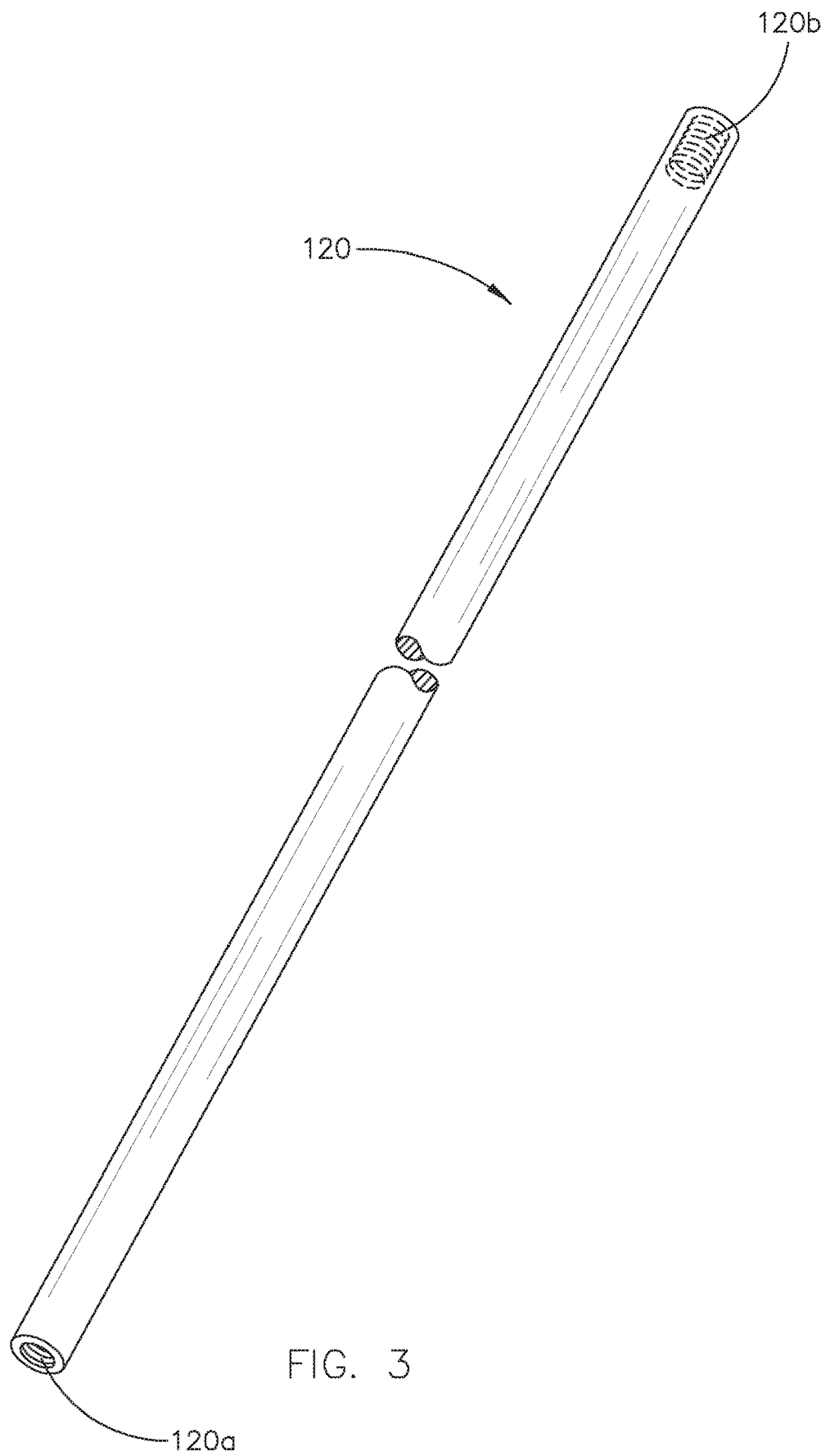
FIG. 3 illustrates an exploded view of a shaft of a device for stacking, displaying, and serving food items, in accordance with an embodiment of the present disclosure.

FIG. 3 illustrates an exploded view of the shaft 120, in accordance with an embodiment of the present disclosure. The shaft 120 may include at least a first end 120a and a second end 120b. The first end 120a may be removably coupled with the base 110. The second end 120b may be configured to connect with the removable cap 130. At least one of the first end 120a or the second end 120b of the shaft 120 may be threaded. It is noted herein that although FIG. 3 depicts the first end 120a and the second end 120b as being threaded such configuration is provided merely for illustrative purposes and shall not be construed as limiting the scope of the present disclosure.

The threaded portion may be configured to couple with at least the removable cap, an additional shaft, the base 110, or the like. For example, as shown in FIGS. 1A and 1B, the first end 120a of the shaft 120 may couple to the base 110. For instance, the first end 120a of the shaft 120 may couple to the base 110 such that the base 110 may lay flat on a table, a floor, or the like. By way of another example, the second end 120b may be removably coupled with the removable cap 130. For instance, as shown in FIG. 1B, the second end 120b of the shaft 120 may be coupled to an s-hook, such that the device 100 may couple with an additional device (not shown). By way of another example, the first end 120a or second end 120b of the shaft 120 may couple to an additional shaft (not shown) via a joiner bolt. For instance, the first end 120a of the shaft 120 may be coupled to an additional shaft such that the shaft 120 is elongated to accommodate additional stacker plates and food items.

It is noted herein that the shaft 120 may in any length and diameter known in the art. For example, the shaft 120 may be 8 inches long. For instance, the shaft 120 having a length of 8 inches would be configured for a single serving of multiple courses. By way of another example, the shaft 120 may be 24 inches long. For instance, the shaft 120 having a length of 24 inches would create a grand presentation of desserts suspended from the ceiling or a hook. By way of a further example, the shaft 120 may be 36 inches long. For example, the shaft 120 may be 1 mm in diameter. By way of another example, the shaft 120 may be 2 mm in diameter. By way of a further example, the shaft may be 4 mm in diameter. These dimensions are provided merely for illustrative purposes and shall not be construed as limiting the scope of the present disclosure.

FIGS. 4A-4H illustrate exploded views of the plurality of stacker plates 140, in accordance with an embodiment of the present disclosure. The plurality of stacker plates 140 may be configured to support a food item along positions of the shaft 120. Each stacker plate 140 may include a support member 140a and a protrusion 140b. The protrusion piece 140b may have a diameter greater than the diameter of the shaft 120 such that the protrusion 140b may be configured to surround the shaft 120. The support member 140a may comprise at least one of a plate, a bowl, a spoke, a cake pop holder, a ribbon plate, a disk, an off-center plate, a layer sheet cake plate, or the like.

The bottom surface of the support member 140b may include an indent (not shown). The indent may be configured to provide more support for a second stacker plate below a first stacker plate. For example, the protrusion 140b of the first stacker plate may connect with the indent on the support member 140b of the second stacker plate.

It is noted herein that the stacker plates 140 may be constructed of any material known in the art suitable for supporting food items. For example, the stacker plates 140 may be constructed of, but not limited to, food-safe polycarbonate, stainless steel, or the like. By way of another example, the stacker plates 140 may be constructed of any disposable material known in the art. For instance, the stacker plates 140 may be constructed of, but not limited to, paper, cardboard, bio resins, or the like. The disposable stacker plates 140 versions can be colored or patterned to coordinate with various themes. By way of a further example, the stacker plates 140 may be constructed of any edible material known in the art. For instance, the stacker plates 140 may be constructed of, but not limited to, one or more food items, paper, or the like.

Figure 4A:
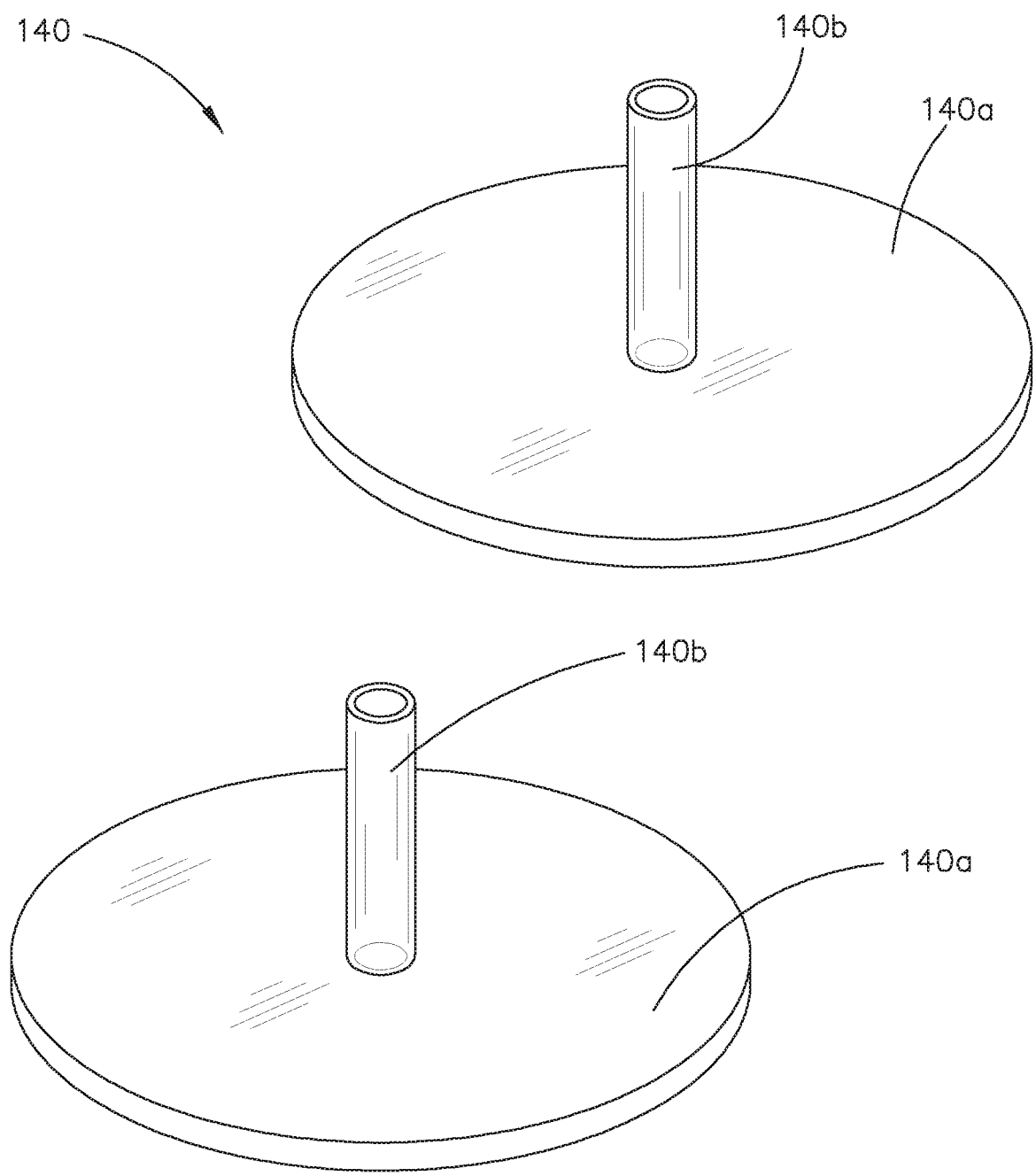
FIG. 4A illustrates an exploded view of a plurality of stacker pieces of a device for stacking, displaying, and serving food items, in accordance with an embodiment of the present disclosure.

Referring to FIG. 4A, the plurality of stacker pieces 140 may be configured to support one or more food items in a plate configuration. The stacker plates 140 may be any diameter known in the art. For example, the stacker plates 140 may have a diameter of 5 inches as shown in FIG. 4A. By way of another example, the stacker plates 140 may have a diameter of 7 inches as shown in FIG. 4A. These dimensions are provided merely for illustrative purposes and shall not be construed as limiting the scope of the present disclosure.

A user may arrange the stacker plates 140 such that the user may use stencils to create patterns and designs using edible paint on the surface of the stacker pieces 140. For example, the user could use a 5 inch stacker piece with a 3 inch cake, which leaves a 1 inch border around the cake. For instance, the user may use a stencil to create a beautiful pattern or text around the 1 inch edge of the stacker piece such that the cake is "framed" with another simple, yet elegant design element, allowing even further design versatility.

Figure 4B:
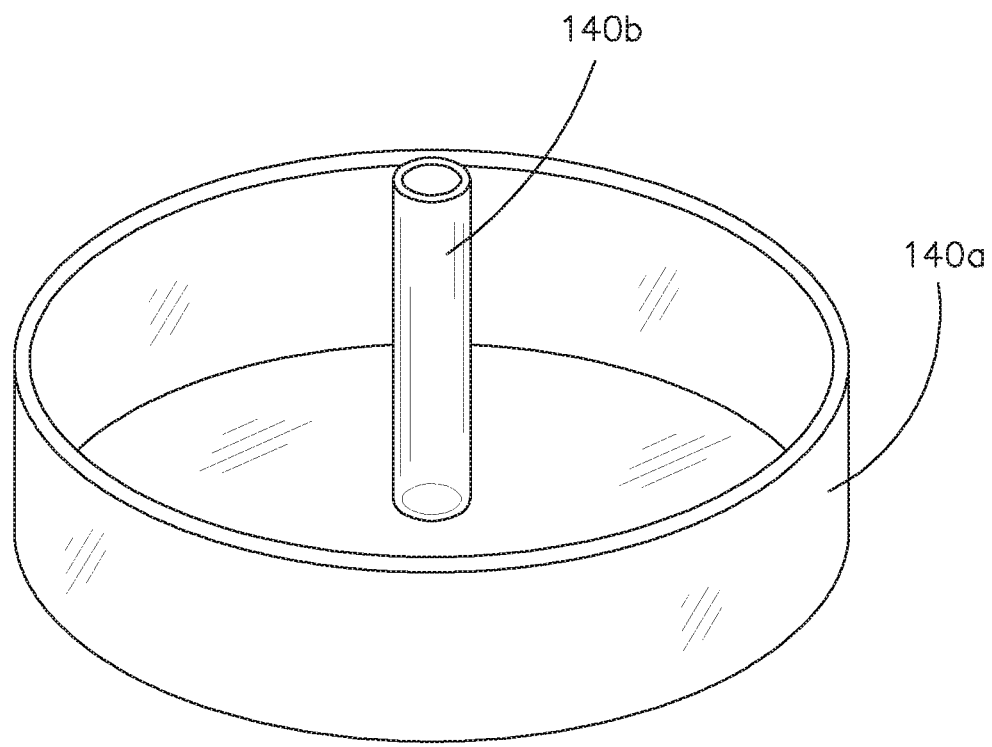
FIG. 4B illustrates an exploded view of a plurality of stacker pieces of a device for stacking, displaying, and serving food items, in accordance with an embodiment of the present disclosure.

Referring to FIG. 4B, the plurality of stacker plates 140 may be configured to support one or more food items in a bowl configuration. The support member 140a of the stacker pieces 140 may have an edge such that the edge height allows a user to serve food items in a bowl configuration. For example, the user may be able to serve dips, soups, or the like in the stacker plate 140. The support member 140b edges may have a scalloped design or some other design element for added presentation. The protrusion 140b may have a height greater that the support member 140a edge height such that there is space to allow a user to retrieve the food item.

Figure 4C:
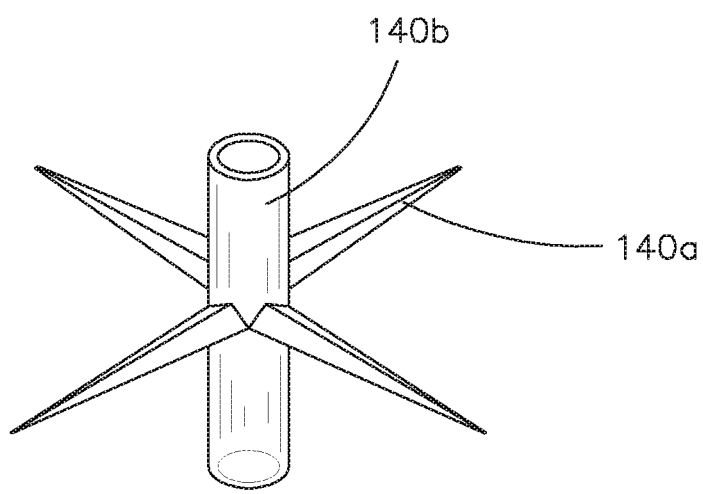
FIG. 4C illustrates an exploded view of a plurality of stacker pieces of a device for stacking, displaying, and serving food items, in accordance with an embodiment of the present disclosure.

Referring to FIG. 4C, the plurality of stacker plates 140 may be configured to support one or more non-flat (e.g., spherical) shaped food items such as, but not limited to, cheeseballs, doughnut holes, truffles, strawberries, and other smaller bite-size foods. The protrusion 140b may include one or more spoke shaped support members extending out from the protrusion 140b such that a user may pierce various aforementioned food items. The one or more spoke shaped support members may be any length known in the art suitable for supporting the one or more food items. For example, the spoke shaped support members may have a length of 2 inches. By way of another example, the spoke shaped support members may have a length of 4 inches. These dimensions are provided merely for illustrative purposes and shall not be construed as limit the scope of the present disclosure.

Further, the number of spoked support members may vary and the configuration depicted in FIG. 4C shall not be construed as limiting the scope of the present disclosure. For example, the stacker plate 140 may contain 4 spoked support members. By way of another example, the stacker plate 140 may contain 6 spoked support members.

Figure 4D:
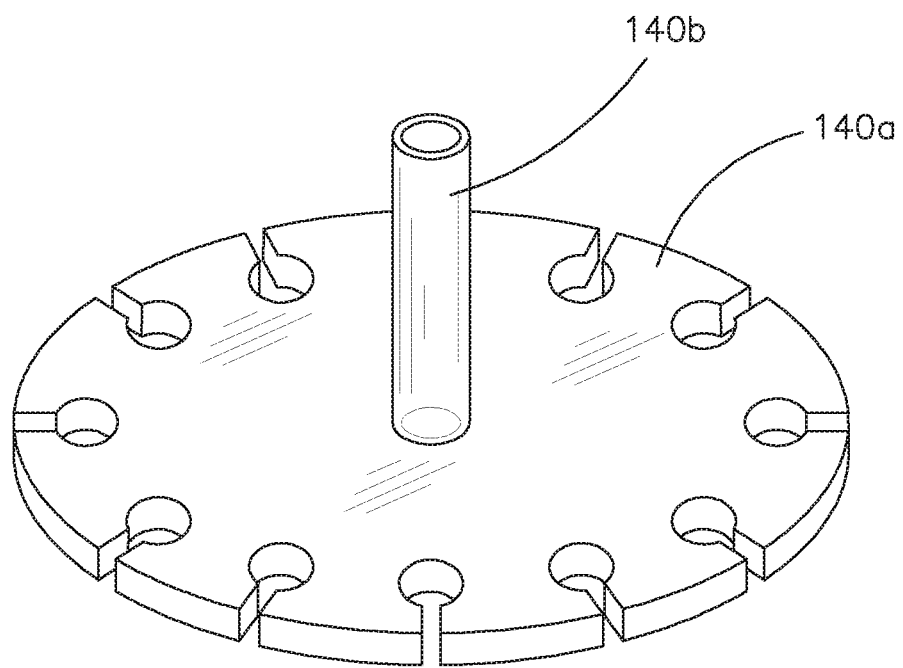
FIG. 4D illustrates an exploded view of a plurality of stacker pieces of a device for stacking, displaying, and serving food items, in accordance with an embodiment of the present disclosure.

Referring to FIG. 4D, the plurality of stacker plates 140 may be configured to support one or more food items on a stick or in a cone. For example, the plurality of stacker plates 140 may be configured to support one or more cake pops, lollipops, corn dogs, ice cream cones, pizza cones, or the like. As shown in FIG. 4D, the support member 140a may include one or more open loop ends configured to support a top end of a food item and a bottom stick end of a food item. For example, the support member 140a may be configured to allow a user to retrieve such food items from the stacker plate 140. The support member 140a may include one or more closed loop ends configured to support a top end of the food item. The one or more closed loop ends may further be configured to support food items in a cone shaped container. The support member 140a may include any number and combination of the open loops ends and/or the closed loop ends. For example, the support member 140a may include 12 open loop ends. By way of another example, the support member 140a may include 12 closed loop ends. By way of a further example, the support member 140a may include 6 open loop ends and 6 closed loop ends. The open loop ends and closed loop ends may be any shape known in the art suitable for supporting one or more food items on a stick or in a cone.

Figure 4E:
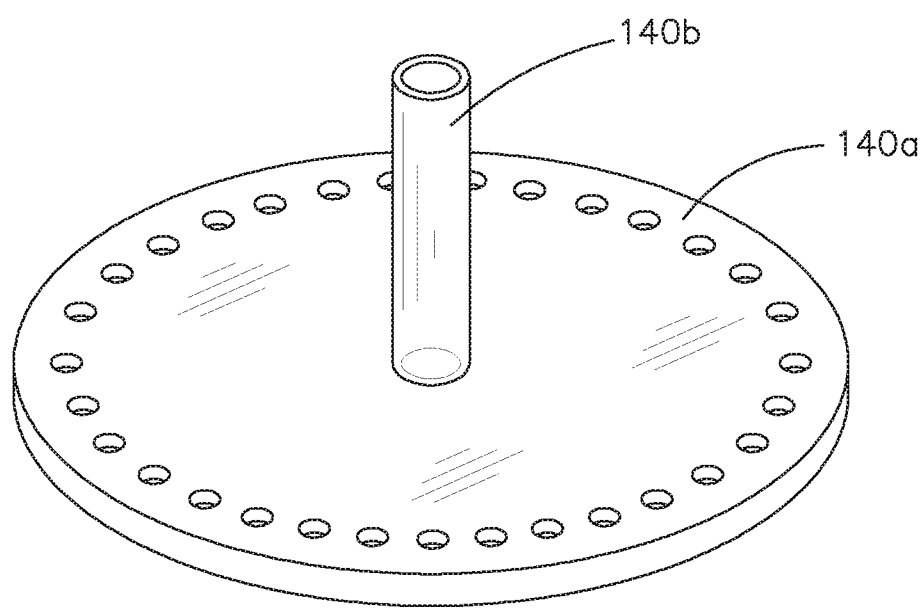
FIG. 4E illustrates an exploded view of a plurality of stacker pieces of a device for stacking, displaying, and serving food items, in accordance with an embodiment of the present disclosure.

Referring to FIG. 4E, the support member 140a may include one or more holes arranged along the outer diameter of the support member 140a. The one or more holes may be configured to allow a user to weave ribbon, yarn, or the like into the support member 140a to enhance the device 100 appearance. The one or more holes may further be configured to allow a user to hang decorative elements from the support member 140a. For example, a user may hang ornaments, jewelry, beads, or the like on the support member 140a. The one or more holes may have any diameter known in the art. For example, the one or more holes may have a diameter of 3.5 mm. By way of another example, the one or more holes may have a diameter of 5 mm. By way of a further example, the one or more holes may have a diameter of 10 mm. These diameter dimensions are provided merely for illustrative purposes and shall not be construed as limiting the scope of the present disclosure.

Figure 4F:
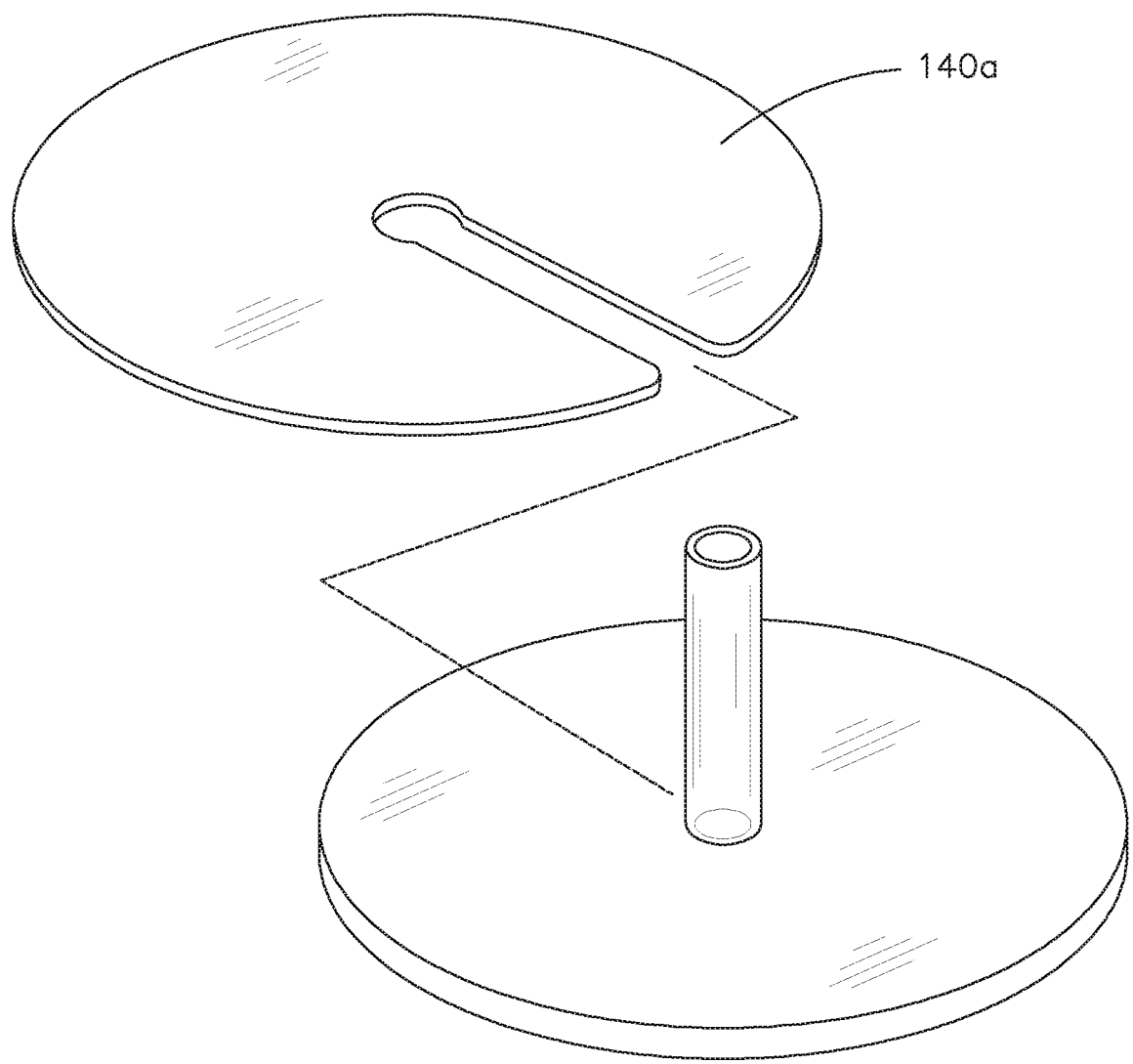
FIG. 4F illustrates an exploded view of a plurality of stacker pieces of a device for stacking, displaying, and serving food items, in accordance with an embodiment of the present disclosure.

Referring to FIG. 4F, the stacker plate 140 may be configured to be retrieved from a position along the shaft 120 while the shaft is coupled to the base 110 and the removable cap 130. For example, the support member 140a of the stacker plates 140 may be disk-shaped such that the slit in the support member 140a allows the stacker plate 140 to be removed from a position along the shaft 120 without removing the removable cap 130 and/or the base 110.

Figure 4G:
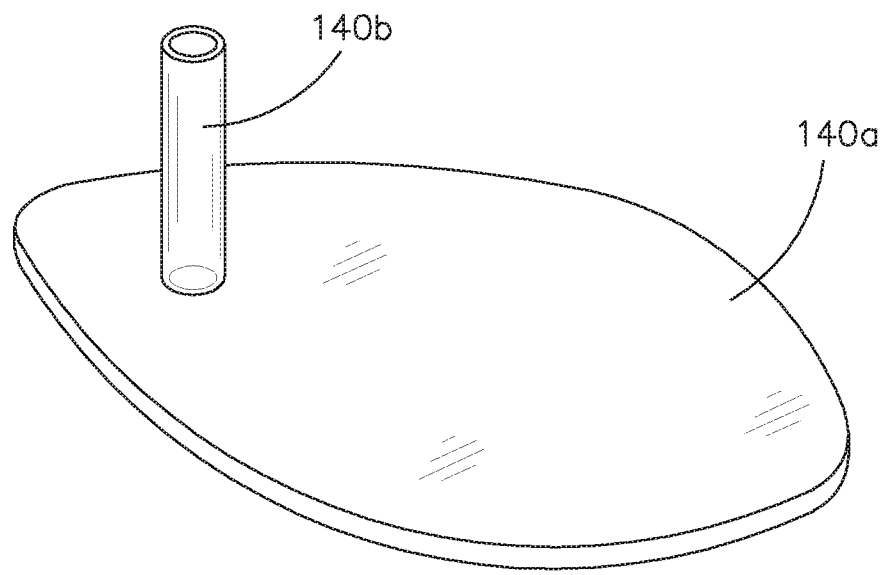
FIG. 4G illustrates an exploded view of a plurality of stacker pieces of a device for stacking, displaying, and serving food items, in accordance with an embodiment of the present disclosure.

Referring to FIG. 4G, the stacker plates 140 may be arranged such that the protrusion 140b is off-center from the support member 140a to create an asymmetrical presentation. The shape of the support member 140a may be any shape known in the art. For example, the support member 140a may be non-circular as shown in FIG. 4G. The shapes shown in FIGS. 1A-7 are provided merely for illustrative purposes and shall not be construed as limiting the scope of the present disclosure.

The stacker plates 140 may be tilted such that the device 100 gives the illusion those foods items are sliding off the stacker plate 140. The tilted stacker plates may or may not also have an edge element to prevent food items from sliding off.

Figure 4H:
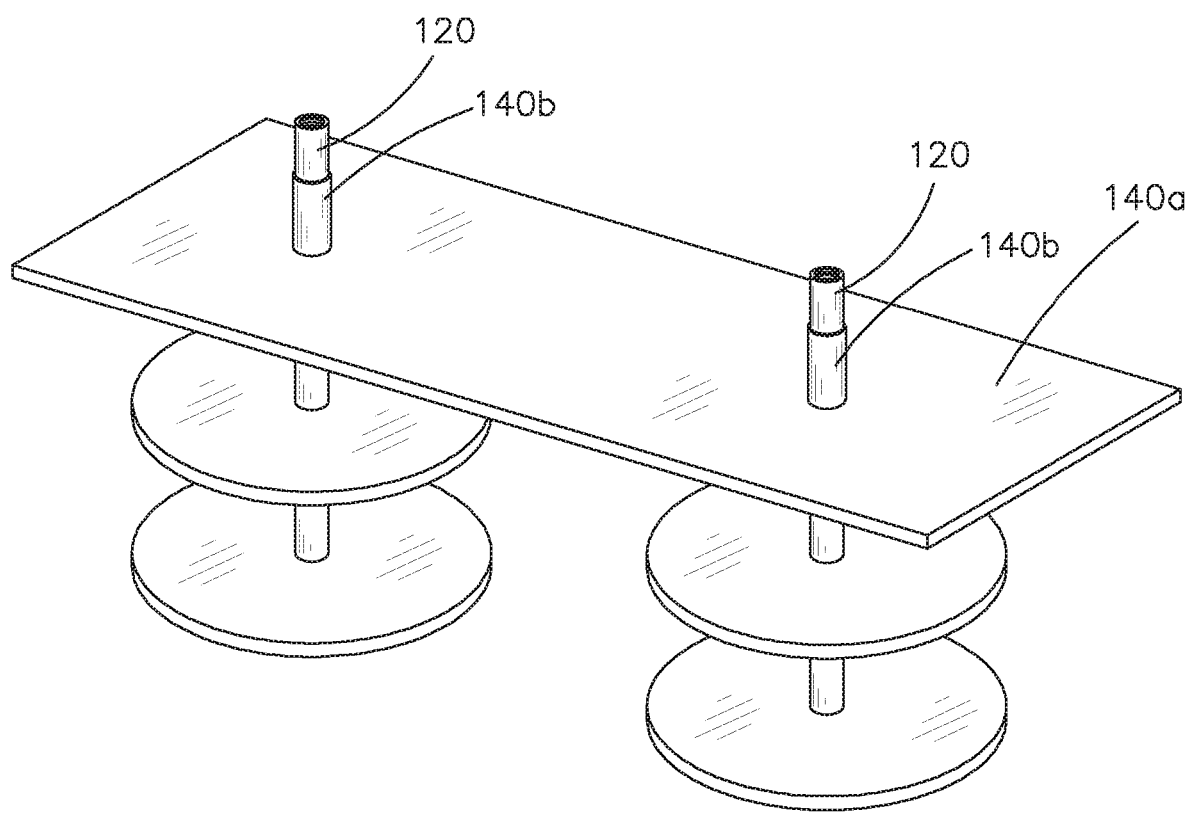
FIG. 4H illustrates an exploded view of a plurality of stacker pieces of a device for stacking, displaying, and serving food items, in accordance with an embodiment of the present disclosure.

Referring to FIG. 4H, the stacker plates 140 may be configured to support one or more larger food items such as, but not limited to, a sheet cake, a pizza, or the like. The stacker plates 140 may include at least two protrusions 140b configured to surround complementary shafts 120. FIG. 4H depicts the stacker plates 140 in a rectangular shape, however, the stacker plates 140 may be any shape known in the art suitable for supporting the desired food item. For example, rectangular support members 140a with multiple protrusions 140b allows a user to create larger displays. For instance, rectangular sheet cake sized support members 140a with at least two protrusions 140b could be used with at least two shafts 120 to create combinations of food displays.

The stacker plates 140 illustrated in FIGS. 4A-4H are provided merely for illustrative purposes and shall not be construed to limit the scope of the present disclosure. A user may selectively choose one or more stacker plates 140 illustrated in FIGS. 4A-4H to serve a variety of food items. For example, multiple meal portions can be served on different levels of the device 100. For instance, a main course may be served on a bottom stacker piece shown in FIG. 4A, a soup or dip may be served on a middle stacker plate shown in FIG. 4B, and a dinner roll may be served on a top stacker piece shown in FIG. 4C. By way of another example, a wedding cake can be served on different levels of the device 100. For instance, a user may alternate between the stacker plates shown in FIG. 4A, the stacker plates shown in FIG. 4G, and the stacker plates shown in FIG. 4H.

Figure 5:
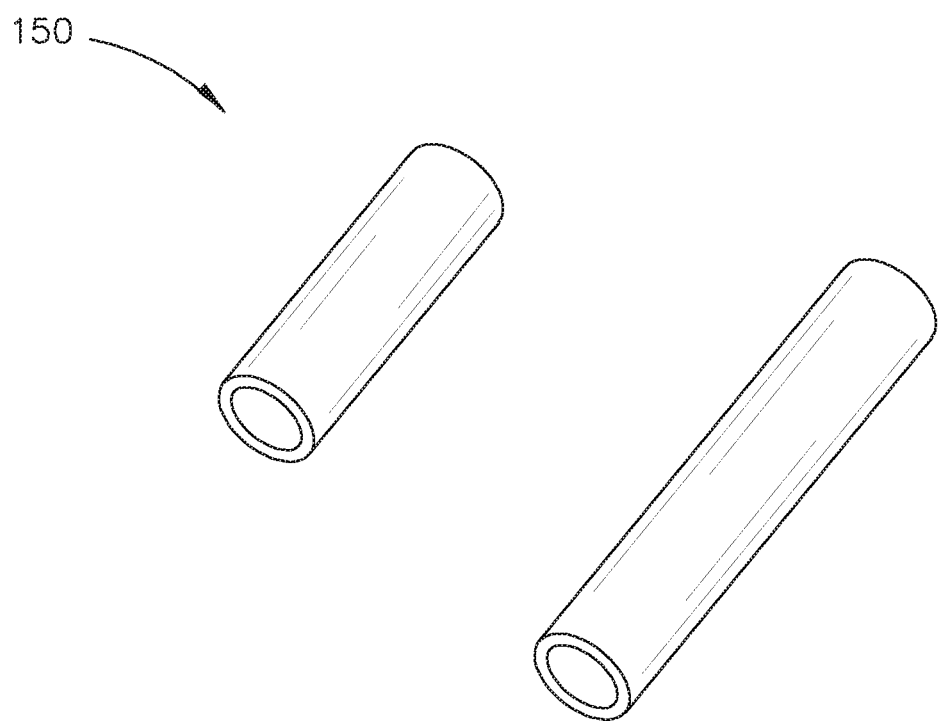
FIG. 5 illustrates an exploded view of an extension shaft of a device for stacking, displaying, and serving food items, in accordance with an embodiment of the present disclosure.

FIG. 5 illustrates an exploded view of an extension shaft 150 of the device 100, in accordance with an embodiment of the present disclosure. The extension shaft 150 may be configured to create additional space between the plurality of stacker plates 140. For example, as shown in FIG. 5, the extension shaft 150 may include a post and the post may have a diameter equal to the diameter of the protrusion 140 such that the extension shaft 150 is flush with the surface of the protrusion 140b. By way of another example, the extension shaft 150 may include an "o" ring and the "o" ring may be configured to slide down the shaft 120. The extension shaft 150 may be constructed of any material known in the art. For example, the extension shaft 150 may be constructed of, but not limited to, rubber, metal, plastic, or the like.

Figure 6A:
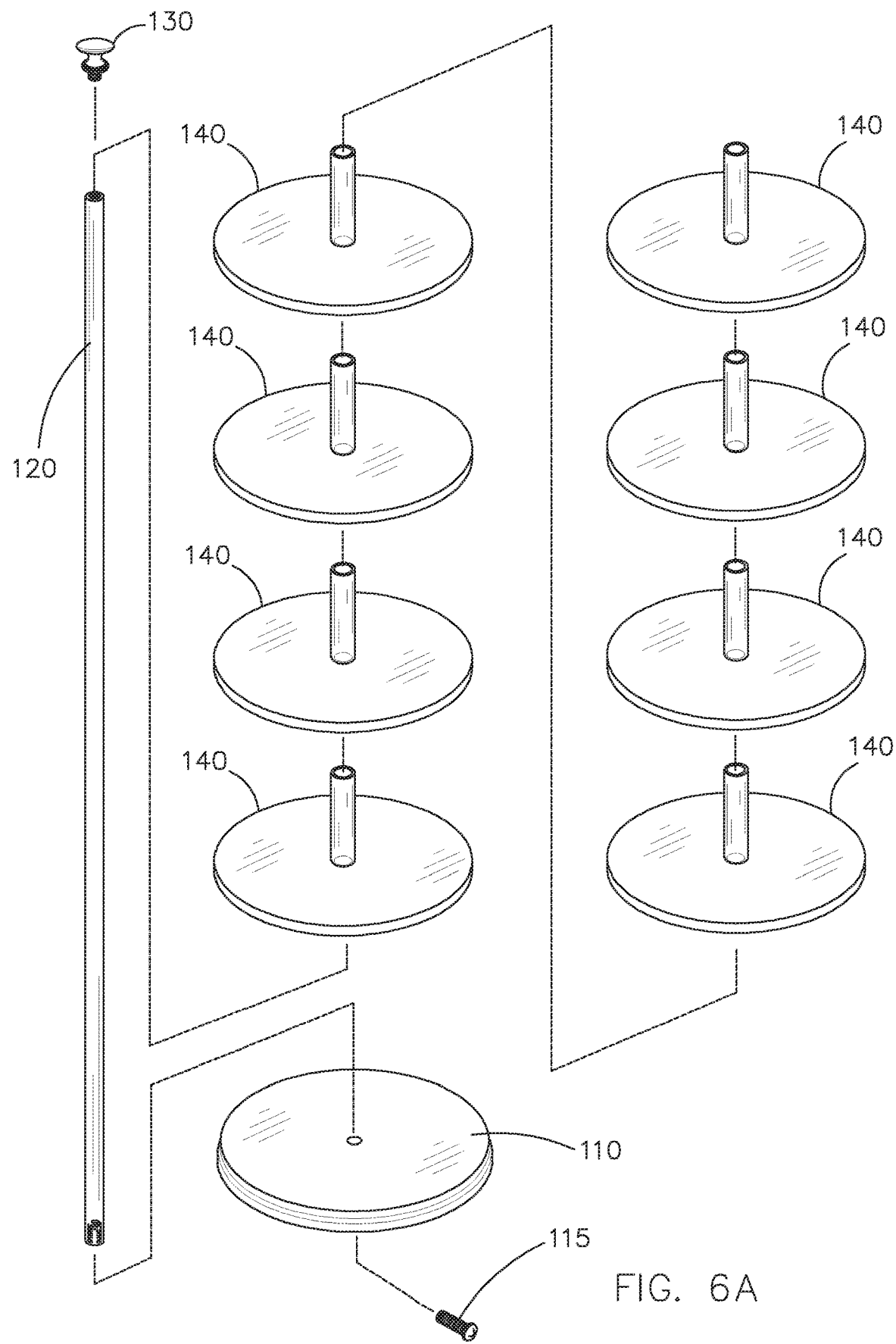
FIG. 6A illustrates an implementation of assembling a device for stacking, displaying, and serving food items, in accordance with an embodiment of the present disclosure.
Figure 6B:
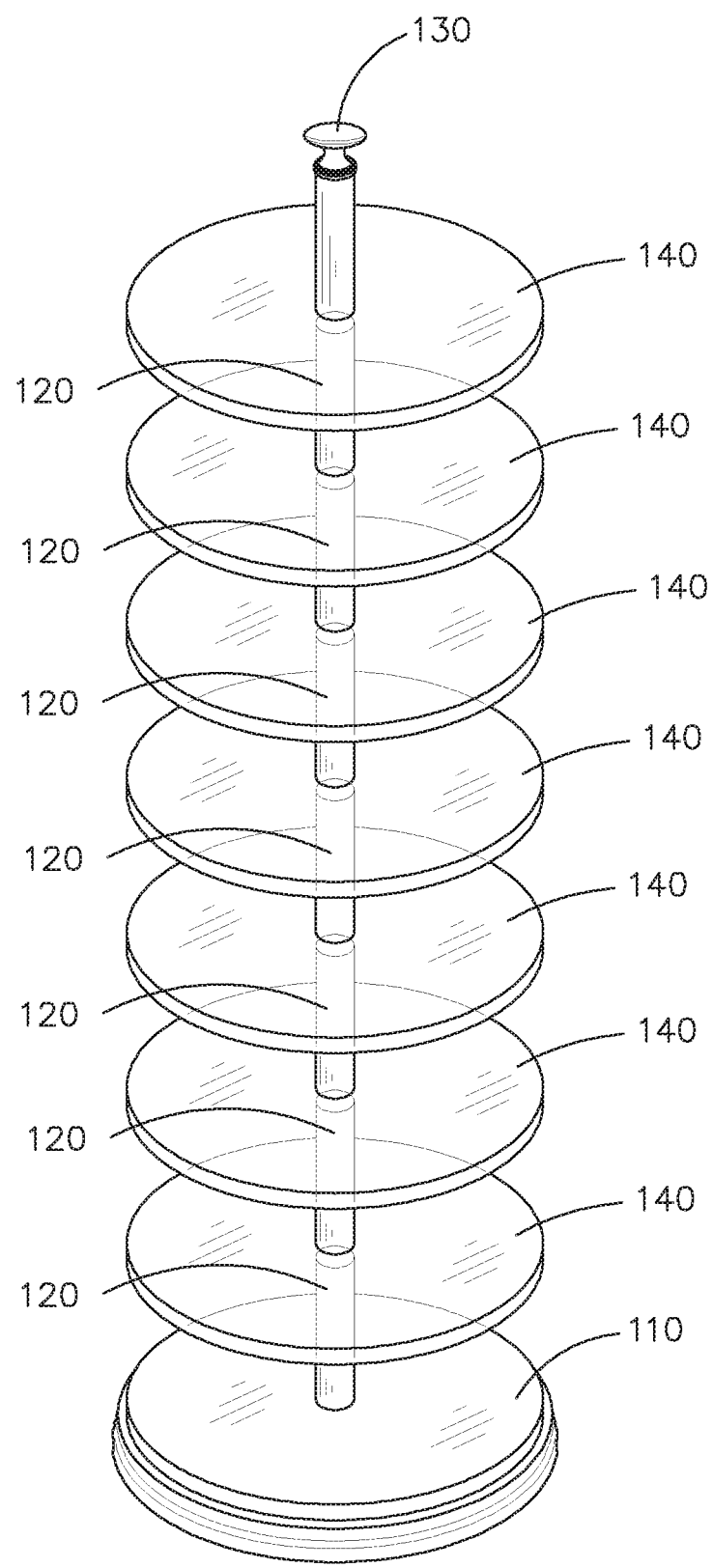
FIG. 6B illustrates an implementation of assembling a device for stacking, displaying, and serving food items, in accordance with an embodiment of the present disclosure.
Figure 7:
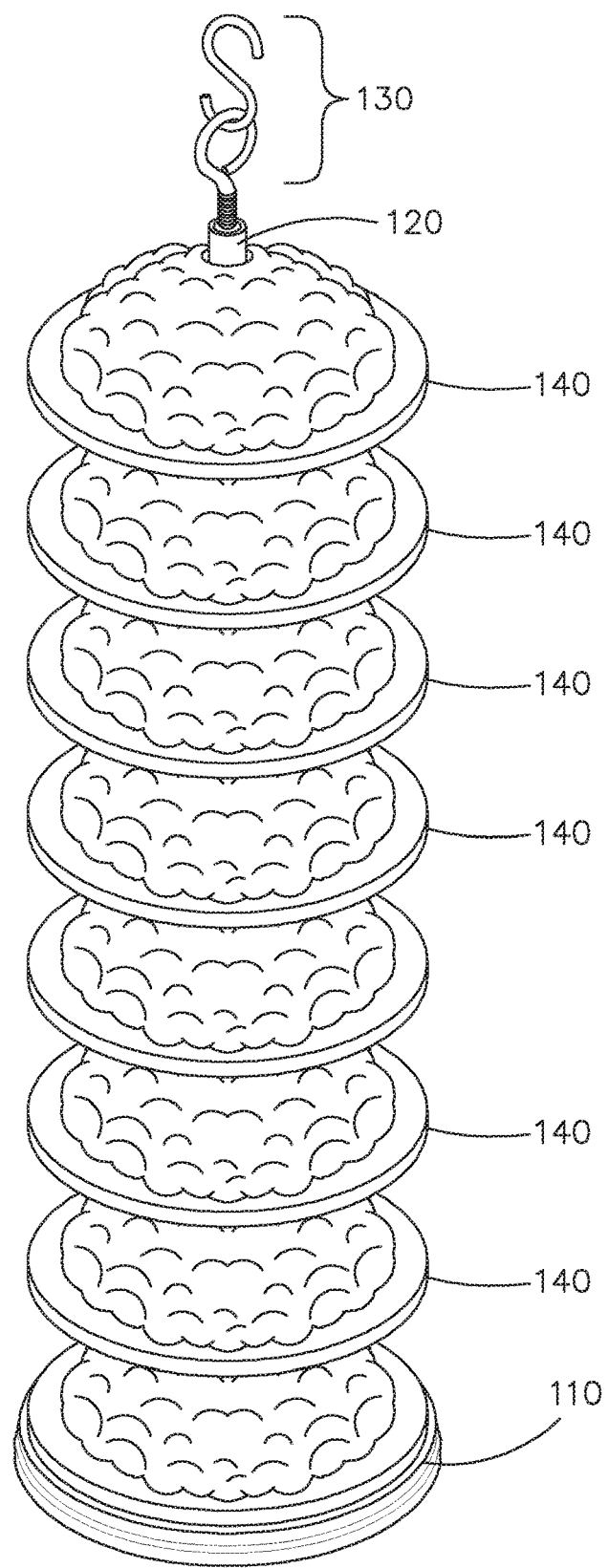
FIG. 7 illustrates an implementation of a device for stacking, displaying, and serving food items, in accordance with an embodiment of the present disclosure.

FIGS. 6A-6B illustrates an implementation of assembling the device 100, in accordance with an embodiment of the present disclosure. FIG. 7 illustrates an implementation of the device 100, in accordance with an embodiment of the present disclosure.

Referring to FIGS. 6A-6B, the device 100 may be assembled by placing the base 110 on a flat surface. The base 110 and the shaft 120 may be coupled together via one or more couplers 115. For example, the one or more couplers 115 may include, but are not limited to, a fastener, an interlock assembly, a tab-and-slot assembly, or the like. For instance, the fastener may include a screw, a bolt, or the like. As shown in FIG. 6A, the fastener may include a screw such that the screw is inserted into the opening in the base 110 and the threaded portion of the screw is coupled to the threaded portion of the shaft 120. A user may twist the shaft 120 such that the shaft 120 is tightly secured to the base 110. For instance, the base 110 and shaft 120 may couple via an interlocking assembly. The base 110 may include a set of recesses and the shaft 120 may include a set of corresponding projections. The set of recesses may not extend through the base 110 but instead terminate at a recessed base portion surface.

It is noted herein that the set of projections on the shaft 120 and the set of recesses on the base 100 may make such that the top surfaces of the set of projections come into contact with the recessed base portion surface. It is additionally noted herein, however, that the set of projections on the shaft 120 and the set of recesses on the base 110 may mate such that the top surfaces of the set of projections are offset from the recessed base portion surface a selected distance.

Once the shaft 120 is coupled to the base 110 via one or more couplers 115, the plurality of stacker plates 140 may be slid onto the shaft 120. After the plurality of stacker plates 140 are slid onto the shaft 120, the removable cap 130 may be coupled to the shaft 120. The removable cap 130 may include a threaded portion configured to couple to the threaded portion of the shaft 120.

Referring to FIG. 7, a user may display food items on the device 100 by arranging the food items on the stacker plates 140 before installing the stacker plates on the shaft 120 or after sliding the stacker plates 140 on the shaft 120. For example, prior to sliding the plurality of stacker plates 140 onto the shaft 120, a user may arrange foods items onto the plurality of stacker plates 140 by selecting foods with an opening in the center or creating an opening in the center. Food items may be slide onto the stacker plates 140 by inserting the protrusion 140a into the opening and pushing the food item such that the bottom surface is flush with the support member 140b of the stacker plate 140. By way of another example, after sliding the stacker plates 140 onto the shaft 120, a user may arrange foods items onto the plurality of stacker plates 140 by placing the foods items on the support members 140a of the stacker plates 140.

A user may use doilies and paper skirts that fit over the protrusion 140b of the stacker piece 140 to allow for more design capabilities. For example, the user may slide doilies over the protrusion 140b of the stacker piece 140 prior to installing each stacker piece 140.

It is noted herein that the food items may include any food item known in the art. The food items reference in FIGS. 4A-4H are provided merely for illustrative purposes and shall not be construed as limiting the scope of the present disclosure.

Constructing the device out of acrylic or some other transparent material would allow for installation of an LED lighting system to create a glowing effect when used.

An alternative design for the post and plate to be joined on the stacker pieces allows the post to twist and lock into place, as opposed to being a rigid union as the current design calls for.

Another alternative design for the post and plate to be joined on the stacker pieces requires a separate post with a small ridge or foot and a "plate" piece that has a hole in the center. The "plate" has a ramp/screw design within the hole that allows the ridge/foot of the foot to twist into place when the post is inserted through the hole.

This eye-hook's functionality can be furthered by creating a joint that allows the loop of the eye-hook to fold flat so that the whole device can be set on a table or other surface without falling over.

The device 100 may further include a container and lid configured to surround the stacker plates 140, the base 110, the shaft 120, and the removable cap 130 such that the device 100 may be easily transported. The container and lid configuration may further include a center element configured to allow the container to slide onto the stacker plates 140 and the shaft 120. For example, the center element may attach to the shaft 120 and the removable cap 130.

It is believed that the novel stacking, display, and serving devices used for pastries, chocolates, and other food items and many of its attendant advantages will be understood by the forgoing description. It is also believed that it will be apparent that various changes may be made in the form, construction, and arrangement of the components thereof without departing from the scope and spirit of the disclosure without sacrificing all of its material advantages.

What is claimed:

1. A device for stacking, displaying, and serving one or more food items, comprising:
   a base, the base including a threaded coupler;
   a shaft, the shaft formed of stainless steel, the shaft including at least a first end and a second end, the first end and the second end include a threaded portion, the first end removably coupled with the threaded coupler of the base, the second end configured to connect with a removable cap, the removable cap includes a cabinet knob, a drawer knob, or a decorative knob and a threaded coupler configured to connect with the threaded portion of the second end of the shaft; and
   a plurality of stacker pieces, each stacker piece of the plurality of stacker pieces configured to support a food item along positions of the shaft, each stacker piece being formed of a disposable material, the disposable material including at least one of paper, cardboard, or bio resin, each stacker piece includes:
   a support member and a protrusion, the protrusion fixedly connected to the support member, the support member configured to hold a food item and the protrusion extending from the support member and having a hole with a diameter greater than a diameter of the shaft such that the support member and the protrusion are configured to surround the shaft, wherein a first stacker piece of the plurality of stacker pieces includes the support member that is configured to contact the base, the support member comprises:
   at least one of a bowl, a cake pop holder, a disk, or a plate.

2. The device of claim 1, wherein the removable cap includes:
   an eye-hook, an eye bolt, or a loop.

3. The device of claim 2, wherein the at least one of the eye-hook, the eye bolt, or the loop is coupled to an s-hook.

4. The device of claim 1, wherein the device further includes:
   one or more posts, the one or more posts configured to removably position to the protrusion of the stacker pieces.

5. A device for stacking, displaying, and serving one or more food items, comprising:
   a base, the base including a threaded coupler;
   a shaft, the shaft including at least a first end and a second end, the first end and the second end include a threaded portion, the first end coupled with the threaded coupler of the base, the second end configured to connect with a removable cap, the removable cap includes a an eye-hook, an eye bolt, or a loop and a threaded coupler configured to connect with the threaded portion of the second end of the shaft, wherein the at least one of the eye-hook, the eye bolt, or the loop is coupled to an s-hook; and
   a plurality of stacker pieces, each stacker piece of the plurality of stacker pieces configured to support a food item along positions of the shaft, wherein each stacker piece includes a protrusion and at least two spoke shaped support members coupled to the protrusion, the protrusion having a hole with a diameter greater than a diameter of the shaft such that the protrusion is configured to surround the shaft.

6. The device of claim 5, wherein the removable cap includes:
   a cabinet knob, a drawer knob, or a decorative knob.

7. The device of claim 5, wherein the plurality of stacker pieces is comprised of:
   polycarbonate.

8. The device of claim 5, wherein the shaft is comprised of:
   stainless steel.

* * * * *